United States Patent
Pedlow, Jr.

(10) Patent No.: US 7,657,913 B2
(45) Date of Patent: Feb. 2, 2010

(54) METHOD AND APPARATUS FOR CORRECTING CORRUPTED DIGITAL VIDEO TRANSPORT STREAMS

(75) Inventor: Leo Mark Pedlow, Jr., Ramona, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 2009 days.

(21) Appl. No.: 09/881,609

(22) Filed: Jun. 14, 2001

(65) Prior Publication Data

US 2002/0087995 A1 Jul. 4, 2002

Related U.S. Application Data

(60) Provisional application No. 60/211,881, filed on Jun. 14, 2000.

(51) Int. Cl.
*H04N 7/173* (2006.01)
*H04L 12/28* (2006.01)

(52) U.S. Cl. ............... 725/95; 725/90; 725/91; 370/431

(58) Field of Classification Search ............ 725/87, 725/90, 91, 95, 93, 96; 709/231, 232, 213; 370/505, 506, 395.2, 431
See application file for complete search history.

(56) References Cited

U.S. PATENT DOCUMENTS

| | | | | |
|---|---|---|---|---|
| 5,790,935 A | * | 8/1998 | Payton | 725/91 |
| 5,819,019 A | * | 10/1998 | Nelson | 714/4 |
| 5,822,530 A | * | 10/1998 | Brown | 725/96 |

* cited by examiner

*Primary Examiner*—James Sheleheda
(74) *Attorney, Agent, or Firm*—Fitch, Even, Tabin & Flannery

(57) ABSTRACT

A digital video system, method, and computer program product for correcting corrupted digital video transport streams is described. The digital video system may include a digital cable, digital broadcast satellite (DBS), high definition television (HDTV), or video-on demand (VOD) system. In a VOD system, a VOD client at each receiver is capable of subscribing to one or more VOD sessions. The headend includes a video server and a control server that is coupled to the video server. The video server transmits one or more VOD sessions to one or more receivers over a transport stream. The control server can also cause the video server to transmit one or more dummy sessions to maintain a predetermined minimum bandwidth of content over the transport stream. Alternatively, the headend can transmit one or more null packets having a randomized payload, as necessary, to maintain a constant bit rate over the transport stream.

2 Claims, 5 Drawing Sheets

METHOD AND APPARATUS FOR CORRECTING CORRUPTED DIGITAL VIDEO TRANSPORT STREAMS

CROSS REFERENCES TO RELATED APPLICATIONS

The present application is a Non-Provisional Application of a Provisional Application entitled "VIDEO ON DEMAND TRANSPORT STREAM CORRUPTION," assigned Provisional Application Ser. No. 60/211,881, and filed Jun. 14, 2000.

BACKGROUND OF THE INVENTION

1. Field of the Invention

The present invention relates generally to television systems, and specifically, to a method and apparatus for correcting corrupted digital video transport streams using a constant minimum bandwidth allocation, randomized null packet payloads, and/or framing validity technique.

2. Background Information

The advancement of technology has facilitated the development and transmission of digital programming to consumers. One such programming is video on demand (VOD). VOD is a service that is offered by, for example, cable companies which allows customers, for a fee, to order and view movies or other programming at any time, typically by using the consumer's set top box. VOD thus offers flexibility by allowing the user to decide when to watch VOD programs. VOD offers a further advantage of allowing the user to pause the VOD program when the user is interrupted by a telephone call, doorbell, etc.

However, VOD service may occasionally cause reception problems. When a VOD program is selected for download to a client receiver, the video services received and decoded may be obscured by artifacts. The degree of obscuration may be total yielding the program content unwatchable. The problem is most prevalent when only a single session is being supported by the system on an RF channel and virtually guaranteed to occur when that single session has been paused and the customer temporarily tunes away. The problem occurs immediately after channel change to the VOD transport stream.

SUMMARY OF THE INVENTION

In one embodiment, a digital video system includes a headend that is coupled to a plurality of receivers over a transmission channel. A client at each receiver is capable of subscribing to one or more video sessions. The headend includes a video server and a control server that is coupled to the video server. The video server can transmit one or more video sessions to one or more receivers over a transport stream. The control server can dynamically allocate and terminate video sessions over the transport stream as video clients are added and terminated. The control server can also cause the video server to transmit one or more dummy sessions over the transport stream to maintain a minimum bandwidth of content over the transport stream.

In another embodiment, a digital video method includes receiving requests from one or more clients for one or more VOD sessions, transmitting one or more video sessions to the one or more clients over a transport stream having a constant bit rate, and transmitting one or more null packets, as necessary, to maintain the constant bit rate over the transport stream. The one or more null packets include a randomized payload.

Other embodiments are described and claimed herein.

DETAILED DESCRIPTION

As discussed herein, various terms are used to describe certain elements or characteristics of the present invention. For example, a "transmission channel" is broadly defined as any communication path between a source and a destination. The communication path may include one or more information-carrying lines (electrical wire, fiber optics, cable, HFC, etc.) or wireless communications through established techniques such as infrared (IR), radio frequency (RF), satellite, etc.

Figure 1:
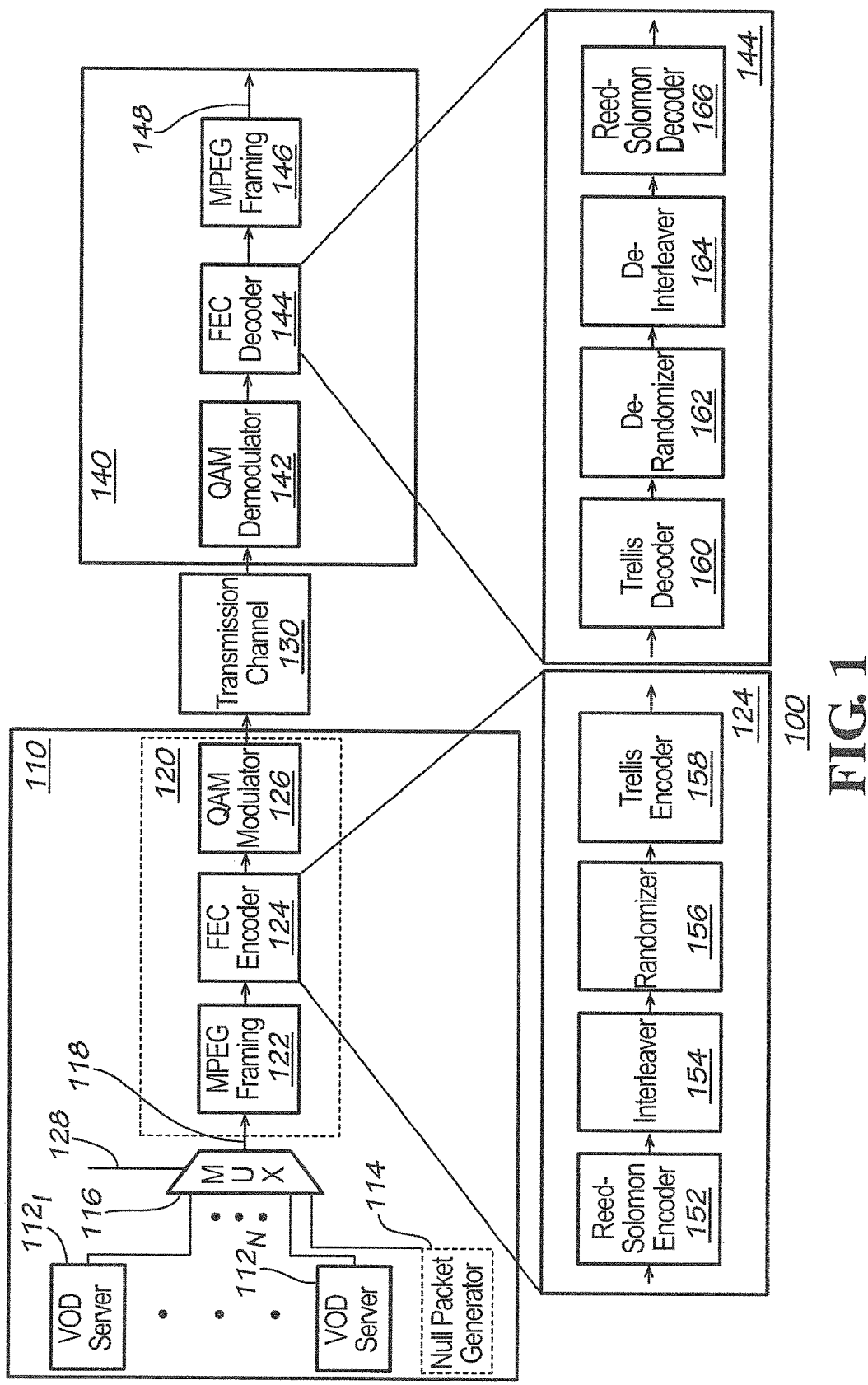
FIG. 1 illustrates a block diagram of a digital video system, according to one embodiment.

FIG. 1 illustrates a block diagram of a digital video system 100, according to one embodiment. The transmission format of television signals in the system 100 is specified, in one embodiment, by the Digital Multi-Programme Systems for Television, Sound and Data Services for Cable Distribution, ITU-T Recommendation J.83, annex "B", April 1997 (hereinafter referred to as "ITU-J.83, annex B"). The entire contents of ITU-T Recommendation J.83 including Annexes A, B, C, and D are incorporated herein by reference. For sake of clarity, the present invention will be described with respect to a video-on-demand (VOD) system. However, it is to be understood that the present invention is not limited to VOD systems. That is, embodiments of the present invention may be implemented in digital cable systems, digital broadcast satellite (DBS) systems, high definition television (HDTV) systems, and any other digital video system based on an MPEG transport format.

Referring to FIG. 1, the system 100 includes a headend 110 coupled to a receiver 140 over a transmission channel 130. The headend 110 may be operated and/or controlled by a broadcaster. The headend includes a video-on-demand (VOD) control server (not shown), one or more VOD servers $112_1$-$112_N$ (where "N" is a positive whole number), a multiplexer (mux) 116, and transmitter 120. Each VOD server 112 may generate one or more VOD programs (or VOD streams). The output(s) of the VOD servers $112_1$-$112_N$ are coupled to the mux 116, which multiplexes the VOD streams at its input(s) onto an MPEG-2 transport stream (or other MPEG version transport stream) on signal line 118. The mux 118 is controlled by the VOD control server via signal line(s) 128.

The MPEG-2 transport stream on signal line 118 includes packets of data having 188 bytes. The MPEG-2 transport stream on signal line 118 is fed to an MPEG framing block 122, which organizes data into groups of fixed symbols, to provide packet synchronization for the receiver. The MPEG framing block 122 provides the frames to a Forward Error Correction (FEC) encoder 124. The FEC encoder 124 uses error correction algorithms and techniques for transporting data reliably over the transmission channel 130.

Also shown in FIG. 1 are an embodiment of the FEC encoder 124 in transmitter 120 and FEC decoder 144 in receiver 140. The FEC encoder 124 includes a Reed-Solomon encoder 152, interleaver 154, randomizer 156, and trellis encoder 158, whereas the FEC decoder 144 includes a trellis decoder 160, de-randomizer 162, de-interleaver 164, and Reed-Solomon decoder 156. The Reed-Solomon encoder 152 provides block encoding for correcting symbols within Reed-Solomon blocks. The interleaver 154 evenly disperses symbols to prevent a burst of symbol errors from being transmitted to a Reed-Solomon decoder. The randomizer 156 randomizes the data to allow effective quadrature amplitude modulation (QAM) demodulator synchronization. The trellis encoder 158 allows the introduction of redundancy to improve the threshold signal to noise ratio. The transmitter 120 further includes a QAM modulator 126 which modulates the television signals.

The receiver 140 includes a QAM demodulator 142, FEC decoder 144, and MPEG framing 146. The output of the MPEG framing block 146 is an MPEG-2 transport stream on signal line 148.

Figure 2:
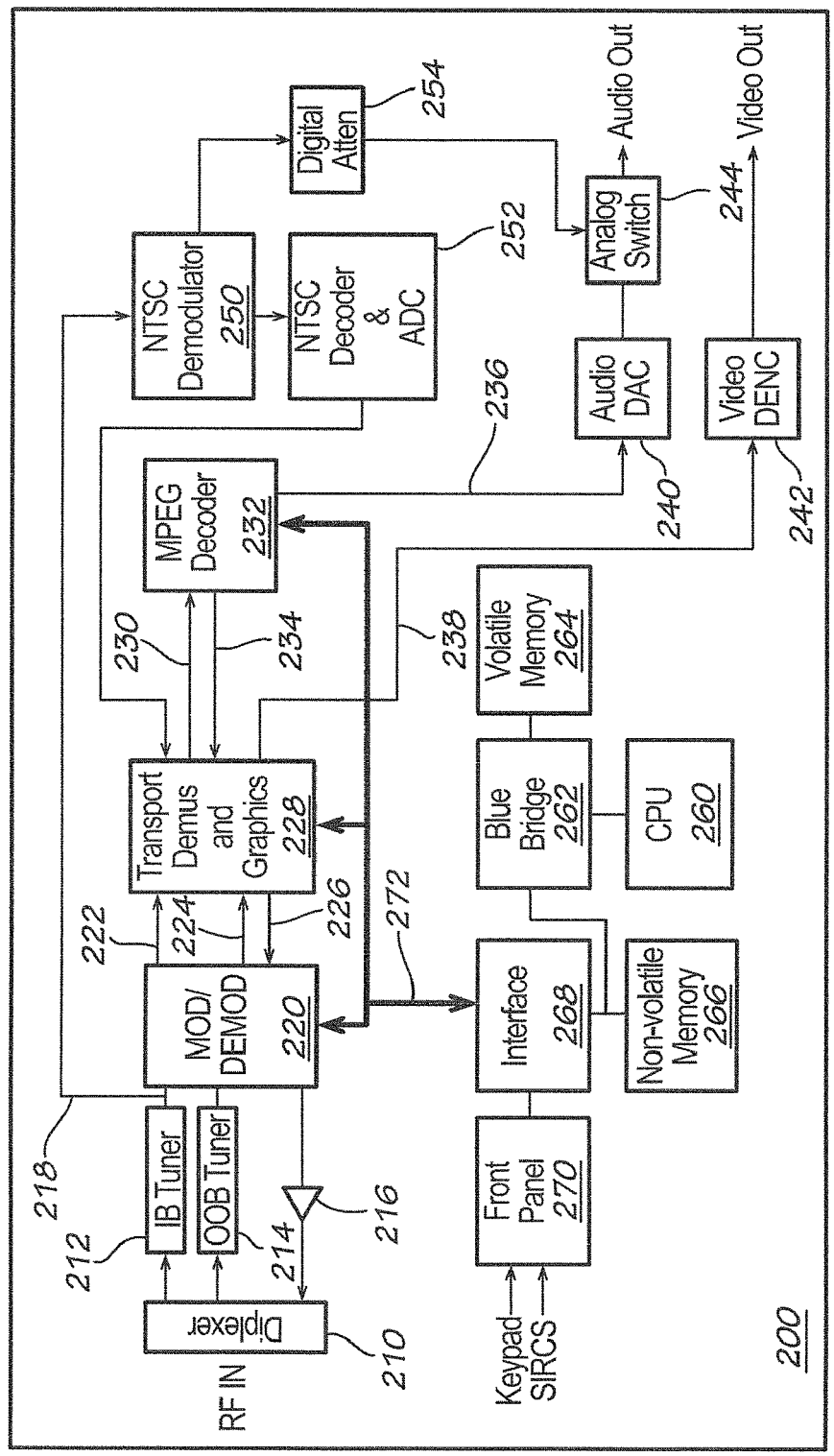
FIG. 2 illustrates an exemplary block diagram of a receiver.

FIG. 2 illustrates an exemplary block diagram of a receiver 200. The receiver 200, in general, receives broadcast signals and performs operations on the broadcast signal to produce digital and/or analog information. For example, the receiver 200 is responsible for decoding the bit stream, for storing programming data in memory accessible by software executed by the receiver 200, and for processing the decoded bit stream to produce one or more output signals having appropriate formats. The receiver 200 may be incorporated into many systems such as a cable box for a Cable Broadcasting System, an Internet terminal, a digital satellite system (DSS) computer, and the like.

Referring to FIG. 2, the receiver 200 includes a diplexer 210 which receives the broadcast signals transmitted from the transmitter 110 over the transmission channel 120. The diplexer 210 forwards the broadcast signals to both an in-band (IB) tuner 212 and an out of band (OOB) tuner 214. The IB tuner 212 tunes the in-band broadcast signals (e.g., audio and/or video) to a desired broadcast channel. The OOB tuner 214 tunes to a private data channel which includes information for billing, encryption, and, in general, remote management of the receiver 200.

Both the audio/video signals and the private data signals are transmitted to a modulator/demodulator (MOD/DEMOD) 220, which performs, among other things, the functions of the QAM demodulator 142, FEC decoder 144, and MPEG framing 146 (FIG. 1). The MOD/DEMOD 220 converts the analog media signals to digital data and reformats the digital data to an appropriate format to provide a digital media stream (e.g., MPEG-2 transport stream). The bit stream is formatted in accordance with any video compression function and may be encrypted under either a symmetric key cryptographic function or a public-key cryptographic function. Typically, the bit stream includes sensory data (e.g., video and/or audio, or communication data) and control information for a number of shows. The control information for each show includes programming data including, but not limited or restricted to, date of broadcast, broadcast channel number, show start-time, show end-time, show title, show type (e.g., sports, news, etc.), etc.

The MOD/DEMOD 220 also converts the private signals to private digital data. The MOD/DEMOD 220 then forwards the digital media stream and the digital private data to a transport demultiplexer (demux) and graphics block 228 on signal lines 222 and 224, respectively. The transport demux 228 extracts the desired audio/video (media) stream intended for the receiver 200, if any, and forwards the media stream to an MPEG decoder 232 via signal line 230. The transport demux 228 may also perform decryption of the filtered and/or demultiplexed stream.

The MPEG decoder 232 decodes the filtered and decrypted stream into its native decompressed audio and video format (e.g., 4:4:4 or 4:2:2 digital video and pulse code modulation "PCM" audio). The MPEG decoder 232 transmits the digital audio to an audio digital to analog converter (DAC) 240 via signal line 236. The audio DAC 240 converts the digital audio stream to analog signals, and transmits the same to an analog switch 244. The MPEG decoder 232 also transmits the digital video stream (e.g., in accordance with the CCIR 656 format) back to the graphics section of the transport demux 228 on signal line 234. The graphics section of the transport demux 228 performs rendering, compositing, superposition of graphics (e.g., menus, icons, etc.) on the video, and other graphics processing. It is to be noted that although the graphics processing hardware is combined with the transport demux hardware in one device (i.e., device 228), the graphics processing hardware may be implemented in a separate stand alone device.

The IB tuner 212 also provides the traditional television signals to a demodulator 250. In one embodiment, the format of the television signals may be in accordance with a video format established by National Television Systems Committee (NTSC). In other embodiments, the format may be in accordance with Phase Alternating Line (PAL), Sequential Couleur Avec Memoire (SECAM), etc. The demodulator 250 demodulates the analog signal and provides audio signals to a digital attenuator 254 and the video signals to a NTSC decoder and ADC 252. The digital attenuator 254 attenuates the audio signal and provides the same to the analog switch 244. The NTSC decoder and ADC 252 decodes the NTSC signals, converts the decoded signals to a digital video stream in a specified format (e.g., CCIR 656 format), and transmits the same to the graphics portion of the transport demux 228 on signal line 256.

The receiver 200 also includes a central processing unit (CPU) 260 which may include a microprocessor, microcontroller, ASIC, etc. The CPU 260 is coupled to a volatile memory 264 and non-volatile memory 266, via a bus bridge 262. The volatile memory 264 may include a random access memory (RAM) and the non-volatile memory 266 may include read-only memory (ROM), flash memory, etc. The non-volatile memory 266 includes interrupt service routines, menus, event data, programming data, software modules and routines, etc. for execution by the CPU 260 to control the operation of the receiver 200. The CPU 260 is coupled to an interface circuit 268 which interfaces with the devices (e.g., MOD/DEMOD 220, transport demux 228, MPEG decoder 232, etc) over a system bus 272, allowing the CPU 260 to control the devices, check status, etc.

The receiver 200 further comprises a front panel 270 which includes a display, and keys or switches for receiving user inputs or commands. The display may include a seven-segment, LCD, or other display for displaying the channel number, time, and/or other information such as an event scheduled or programmed in a menu. The front panel 270 also receives commands from a remote controller (not shown), and decodes the commands to produce interrupt request signals (IRQs) corresponding to the commands. Each IRQ may be transferred to the CPU 260.

The interface 268 may be connected to other external peripheral devices. For example, the interface may include circuitry which complies with the IEEE standards document 1394 entitled "Standard for High Performance Serial Bus" (hereinafter referred to as "IEEE 1394"). This enables the receiver 200 to connect to digital-input peripheral devices such as digital VCRs, digital video disk players, digital laser disk players and the like.

The graphics portion of the transport demux 228 transmits the traditional digital video signals (from the NTSC decoder and ADC 252) or the digital video signals (from the MPEG decoder 232) to a video encoder 242 over signal line 238, based on user input and CPU 260. The graphics portion of the transport demux 228 may receive data representative of menus from the CPU 260, and overlay or otherwise blend the menus with the digital signal. The video encoder 242 converts the digital video signal to analog form on the Video Out signal line. The Video Out and Audio Out signal lines of the receiver 200 are coupled to at least one analog-input peripheral device such as a display monitor (e.g., a television receiver having a display screen) and/or a recording device (e.g., a video cassette recorder "VCR").

The ITU-J.38 annex B specifies two distinct and concurrent types of data synchronization in the system 100. These include FEC synchronization and MPEG frame synchronization. FEC synchronization is independent of the packet size and is performed by the transport demux 228 on the incoming stream of symbols from the QAM demodulator of the MOD/DEMOD 220. The frame size for the FEC frame in 256 QAM modulation format is 11,264 symbols (7 bits per symbol) followed by a 40 bit sync word ("trailer"). This structure is used for establishing the correct starting point of a data sequence for the FEC decoder (derandomizer, deinterleaver, and Reed-Solomon decoder). The second type of synchronization is MPEG synchronization, performed by the MPEG decoder 232, which provides 188 byte packet framing compliant with the MPEG2 transport standard, as defined by Generic Coding of Moving Pictures and Associated Audio Information: Systems (ISO/IEC 13818-1:1996).

From the perspective of receiver 200, the FEC synchronization process is relatively robust with a 2E-10 probability of finding a data sequence that mimics the sync trailer exactly. The probability is reduced further because the FEC frame is further subdivided into blocks of data (122 symbols) with 6 additional parity symbols added per block. In all, a FEC frame of 11,264 symbols includes 88 blocks (128 symbols per block). A count of 88 blocks and a 40 bit frame sync trailer with its characteristic signature would have to be received to truly qualify as a valid frame. Consequently, the chances of false FEC synchronization are remote. The fact that FEC synchronization also transcends packet boundaries further adds to the robustness of the FEC frame protocol.

MPEG frame synchronization, on the other hand, may, in certain situations, cause unrecoverable synchronization errors. MPEG frame synchronization uses a sliding checksum on a bit-by-bit basis to find the start of an MPEG 188 byte packet. The synchronization process involves evaluating the sum of the previous 1496 received bits (187 bytes) and comparing it to the current received byte (byte 188). If the sum of the 187 bytes matches the checksum of the $188^{th}$ byte, the MPEG decoder 232 records the match and confirms that the sum calculated over the next 1496 bits (187 bytes) matches the value of the $188^{th}$ byte. The system keeps statistics regarding how many consecutive matches were obtained over the total number of packets (bytes) evaluated and a threshold can be set to establish a framing "lock" condition. This process has a $\frac{1}{256}$ (or 0.4%) chance of yielding a false match on any single 188 byte sample of data. The probabilities of multiple false matches are reduced by the fact that the preceding FEC process is assumed to yield data free of errors due to channel noise and that MPEG data itself has a vary random distribution. The chance of seeing a false checksum match on consecutive packets becomes more improbable as the threshold for matches is increased. If one considers the probability of a random match on the checksum of four consecutive packets, the probability becomes about 2E-10.

Indeed, the correct operation of the MPEG synchronization process is based upon the paradigm that compressed audio and/or video data has a random appearing distribution and that the data payloads of consecutive packets are never repeated. This paradigm is quite valid in high bandwidth video or when statistical multiplexing algorithms are employed on a transport stream to maximize bandwidth utilization of the channel.

This, however, is not the case for ITU-J.83 annex B based constant bit rate (CBR) systems, especially for VOD applications. In VOD applications, the RF channels are dynamically allocated to clients and as new clients are added, new RF channels are instantiated, and packet identifiers (PIDs) assigned and allocated on a first-come, first-serve basis. In this type of applications, it is quite likely to have as few as a single client on a transport stream at any one time. In all cases, the VOD system 100 by nature has a constant symbol rate. To maintain the constant symbol rate, the headend 110 inserts stuffing packets (null packets) implemented as an optional null packet generator 114 (shown by dashed lines) that is input to the mux 116, embedded inside the mux 116, or embedded inside the transmitter 120 (e.g., at the QAM modulator 118). The MPEG transport specification (Generic Coding of Moving Pictures and Associated Audio Information: Systems (ISO/IEC 13818-1:1996)) defines a unique PID for the purpose of null packets and assigns the ID "0x1FFF" for a null packet. The MPEG standard specifically indicates that the data payload for a null packet may be any value. Typically, the payload bytes are set to 0xFF and it has been said that this is an implementation side effect of an MPEG requirement that the padding bytes used in section data be 0xFF.

Figure 3:
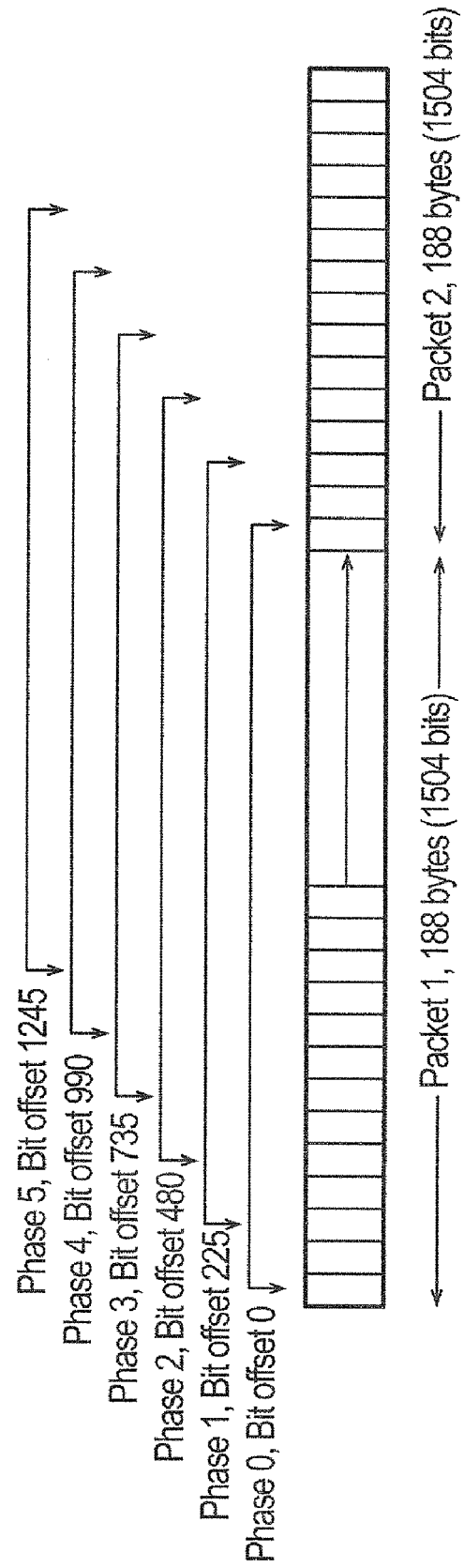
FIG. 3 shows ambiguous packet start locations.

The MPEG framing checksum is actually a linear block code and is designed such that when data is correctly recovered the resultant syndrome byte (from the CRC checksum) is equal to 0x47, the traditional MPEG2 synchronization byte value. Because the checksum is based upon a linear feedback shift register, the actual algorithm employed will result in six discrete points (phases) when a consecutive sequence of null packets with a payload of 0xFF are processed as points of MPEG frame synchronization, as illustrated in FIG. 3. However, only one point provides the correct MPEG frame synchronization. The other five points are ambiguous and while satisfying the mathematical criteria for the checksum, do not align with the correct MPEG2 transport packet boundary.

As the density of null packets increases, the probability of synchronizing to an ambiguous and incorrect MPEG frame approaches the limit of 5/6 (or 83%). This will result in long periods to tune to a high null packet stream and the potential for never actually synchronizing correctly. Analysis of a cable network implementing a VOD system indicates that as few as 180K bits/second of non-null data might be sent on a 256 QAM transport running at 38M bits/second, a null packet density of 99.53%.

An additional parameter that may come into play to further compound the MPEG frame synchronization is the type of multiplexer used. Evaluations of certain multiplexers show that there may be a direct correlation between the onset of the synchronization problem and the brand of multiplexer. Further investigation has indicated that the reason for this is due to the algorithm used in the multiplexer itself when creating the MPEG transport stream. The MPEG specification is not clear on how data is multiplexed regarding packet distribution. In at least one type of multiplexer algorithm, data is placed in the transport stream in bursts as opposed to placing date in the transport stream in a uniform and homogeneous distribution. When data is not evenly distributed, the concentration of null packets is locally increased due to the burst nature of the multiplexer algorithm. Consequently, the type of multiplexer algorithm used may exasperate the synchronization problem, making the number of repeated null packets appear to be greater than is actual and therefore reduce the threshold to the onset of the problem.

In the implementation of a transport decoder based upon a certain brand of demodulator integrated circuit, the problem is further compounded because there is no direct notification to the host of the frame synchronization problem. It is quite easy for the demodulator to detect the condition because it has internal status regarding the condition of FEC synchronization, and can also determine whether the Reed-Solomon module has been able to correct all data errors detected. In the case of false MPEG frame synchronization due to high null packet densities, the FEC system will indicate normal operation, yet any non-null packets passing out of the demodulator will fail the checksum due to the framing error. In this demodulator, the transport error bit in the stream output (TE=1) is set and it is up to the MPEG decoder to determine what action to take. In many cases, this will result in no special action. In addition, upon query of the demodulator, all internal subsystems will report normal conditions, creating yet another ambiguity.

Based upon the evaluation of the issue and an analysis of the cause, it becomes apparent that the VOD system is operating in a mode that is outside the intent or capability of the ITU-J.83, annex "B" standard. Even demodulators that have no reporting ambiguity, as described above, are prone to the framing error problem and will exhibit high error rates, long tuning times and high probability of onset even with multiple re-acquisitions. The problem in general has been shown both by analysis and through empirical data to be systemic in nature and not unique to any one combination of multiplexer, modulator, or demodulator components. The problem can also be recreated under the correct conditions using live encoders instead of a VOD system, although the conditions that cause the problem in a live encoder environment are highly unlikely to occur in real deployment. The opposite is true however for a VOD implementation using dynamic allocation of PIDs in a CBR environment. The problem is not only likely, but rather, should be expected.

Disclosed herein are three separate and independent techniques for correcting the MPEG frame synchronization problem. In a first technique, the headend maintains a constant minimum bandwidth allocation to reduce the number of null packets in the transport stream. In constant minimum bandwidth allocation, the headend system controlling assignment of VOD clients to RF carriers and PIDs insures that each RF channel and its associated transport stream has a minimum non-null content at all times.

Figure 4:
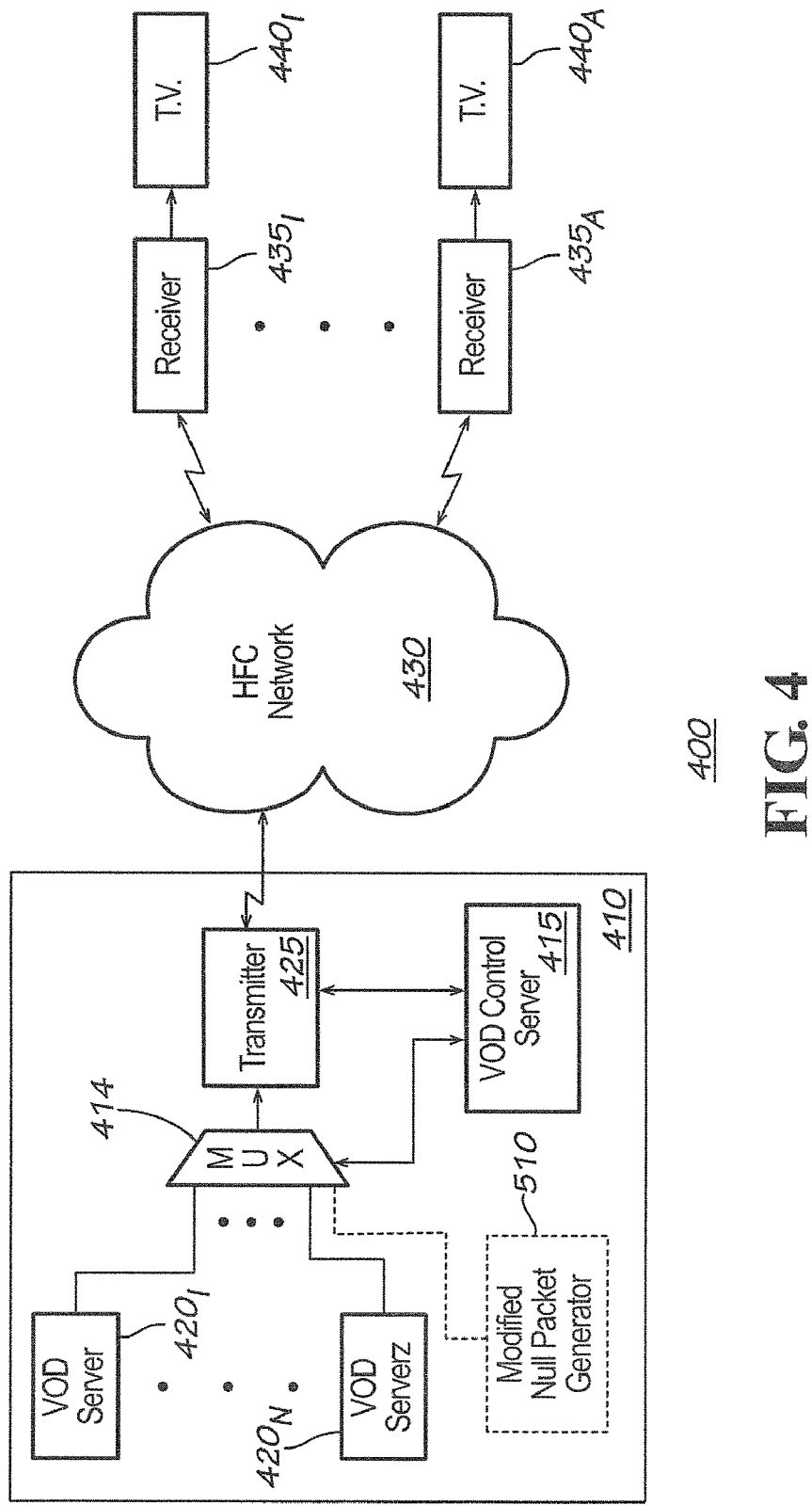
FIG. 4 illustrates an exemplary block diagram of a video-on-demand (VOD) system suitable for implementing one or more embodiments.

FIG. 4 illustrates an exemplary block diagram of a video-on-demand (VOD) system 400 suitable for implementing one or more embodiments. Referring to FIG. 4, the VOD system 400 includes a headend 410 that is coupled to a plurality receivers 435$_1$ to 435$_A$ (where "A" is a positive whole number) over a hybrid fiber coax (HFC) network 430. Each of the receivers 435$_1$ to 435$_N$ is capable of subscribing to VOD programming for display on an attached television (or monitor) 440. In one embodiment, the receivers 435$_1$ to 435$_N$ may be identical to the receiver 200 (FIG. 2). The headend 410 generates and/or transmits VOD sessions having VOD programming over one or more transport streams to subscribing clients. The headend 410 may dynamically allocate and de-allocate VOD sessions over one or more transport streams assigned to one or more RF channels as subscribers at receivers 435 are added and deleted.

The headend 410 includes a VOD control server 415, one or more VOD video servers 420$_1$ to 420$_N$ a multiplexer (mux) 414, and transmitter 425. Although one transmitter is shown, the headend 410 may include a plurality of transmitters. The VOD control server 415 includes one or more processors, memory, and software programs running thereon for processing requests by subscribing clients for VOD programming (via the client's receiver 435 or set top box), assigning and allocating VOD sessions on one or more transport streams corresponding to one or more RF channels and PIDs to clients on the fly, and controlling the one or more VOD video servers 420$_1$ to 420$_N$ for transmitting VOD programming to subscribers. The one or more VOD video servers 420$_1$ to 420$_N$ each includes one or more processors, memory, mass storage, etc. for storing and transmitting VOD programming to subscribing clients in the system 400, in response to control signals received from the VOD control server 415. The VOD video server 415 may include other components and perform other functions. For example, the VOD video server 415 may include a billing database for processing billing for VOD subscribers. In one embodiment, the transmitter 425 is substantially identical to the transmitter 120 (FIG. 1).

In accordance with the first technique, the VOD control server 415 insures that each RF channel and its associated transport stream has a minimum non-null content at all times. The actual minimum content varies from one system to another and depends upon factors such as video bit rate, modulation constellation, multiplexer homogeneity, downstream bit error rate (BER), etc. To maintain a minimum non-null content for each RF channel at all times, the VOD control server 415 creates dummy copies of purchased content and/or activates "padding streams" (hereinafter referred to as "dummy sessions"). The dummy sessions cause the video server(s) 420 to spool out content to PIDs. However, no client is assigned or authorized to access the content. This would create non-null content on the transport stream that is above the threshold for minimum content. When client demand for channel bandwidth exceeds the minimum bandwidth (e.g., a threshold), the session streams can be terminated and the bandwidth assigned to revenue producing session streams. A software module running on the VOD control sever 415 performs the function of causing the one or more video servers 420$_1$ to 420$_N$ to create one or more padding streams or dummy sessions, if necessary, to maintain a minimum bandwidth. This may also be accomplished through hardware.

The second technique involves filling null packets with a random or pseudo-random payload. In this embodiment, a random number generator is utilized for this purpose. Alternatively, the null packets may be replaced with a plurality of predetermined static packets (e.g., a plurality of different and predefined packets). This alternative technique dispenses with the requirement of generating random numbers for the packet payloads on the fly. The use of a random or pseudo random number generator or the use of static packets is generally shown as block 510. The random number generator may also be implemented as a software routine running on one or more video server 420. Alternatively, the modified null packet generator 510 may be internal to the mux 414 or internal to the transmitter 425.

In one embodiment, the random number generator has a period greater than (188*n) bytes. The robustness of such a system would be directly proportional to the number (n) of packets before the algorithm would repeat the "random" sequence. The greater the period, the more tolerant the system may be to channel noise, while minimizing sensitivity to the null padding issue. This technique may have no impact on the stream session VOD control server 415, but may significantly affect the implementation of the multiplexer and/or modulator hardware and software. This technique guarantees compliance with the spirit of annex "B" regardless of utilization of the transport stream bandwidth.

The third technique is a countermeasure that does not prevent the conditions leading to MPEG framing synchronization errors, but provides a mechanism for detecting MPEG framing errors and responding to it.

Referring to FIG. 2, the MOD/DEMOD 220 adds a circuit to its internal logic that implements the following condition:

$$IRQ=!FEC\_SYNC * !UNCORRECTABLE\_RS\_ERROR\_FLAG * MPEG\_CS\_ERROR, \quad (1)$$

FEC_SYNC is a variable used to indicate an error condition in one or more of the QAM demodulator, Trellis Decoder, De-Randomizer, and De-Interleaver, which error may be due to data corruption, a synchronization problem, noise, etc., UNCORRECTABLE_RS_ERROR_FLAG is a variable used to indicate an error condition in the Reed-Solomon Decoder due to an unsuccessful attempt to correct errors in the stream, and MPEG_CS_ERROR is a variable used to indicate a bad checksum or checksum error in the MPEG framing block.

If the condition in equation (1) is met (i.e., only the MPEG_CS_ERROR is asserted to indicate a false lock), the MOD/DEMOD 220 generates an interrupt (e.g., hardware maskable interrupt) to the CPU 260 upon an uncorelated error between the FEC and the MPEG framer, which would occur whenever the system incorrectly synchronized and attempted to process non-null transport data. In response, the CPU 260 may attempt to reinitialize/resynchronize the MOD/DEMOD 220, perhaps with a different combination of register settings to change the MPEG framing criteria(rion). This would allow the receiver 200 to be optimized for minimum channel change time through reduced demodulator acquisition time, and provide a mechanism to detect framing errors and to have applied more robust synchronization thresholds to attempt to reduce the probability of a false lock.

The first and second techniques may be implemented either individually or together for additional robustness. The third technique, which involves the demodulator, may be implemented with one or both of the first and second techniques.

Figure 5:
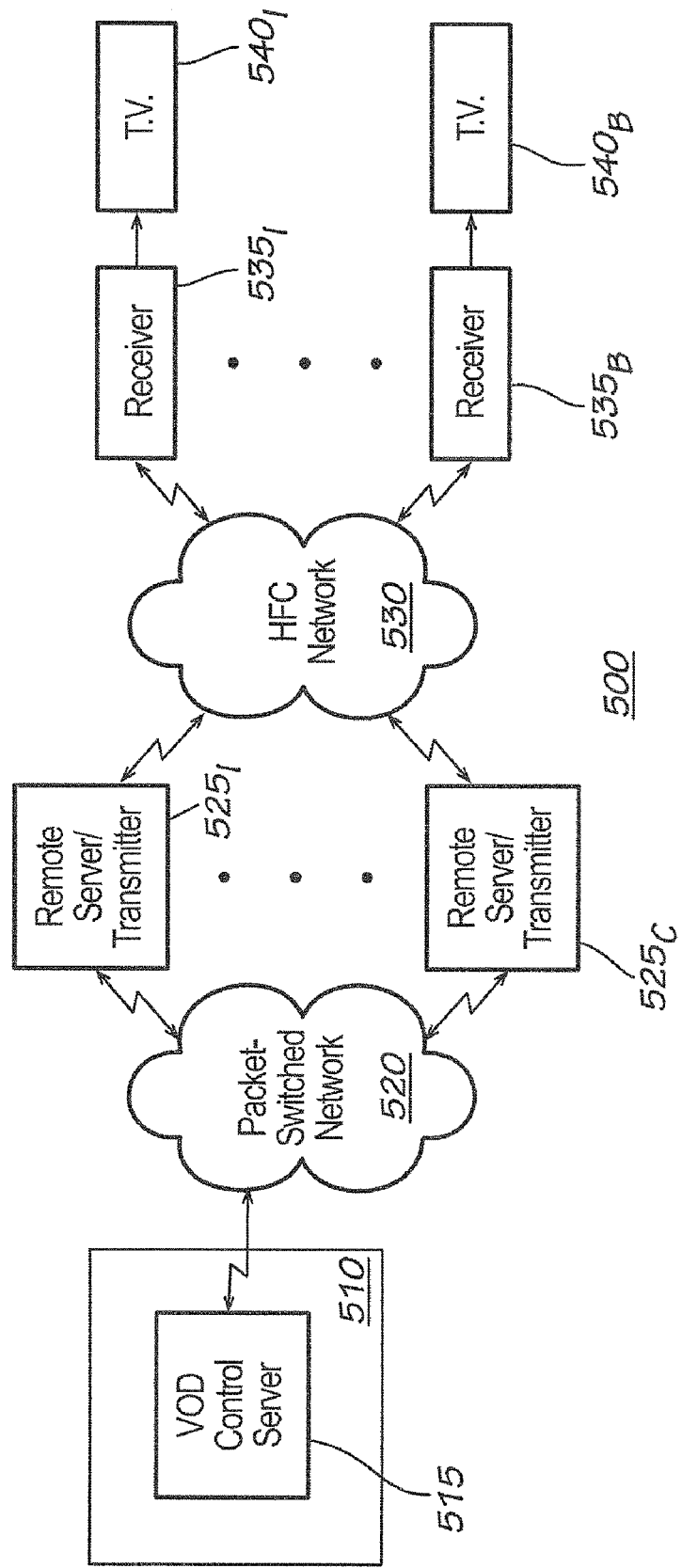
FIG. 5 illustrates another exemplary block diagram of a VOD system suitable for implementation with one or more embodiments.

It is to be appreciated that embodiments of the present invention may be implemented in various VOD systems. FIG. 5 illustrates another exemplary block diagram of a VOD system 500 suitable for implementing one or more embodiments. The system 500 includes a headend 510 that includes a VOD control server 515. The VOD control server 515 is coupled to one or more remote servers $525_1$-$525_C$ (where "C" is a positive whole number) over a packet switched network 520. Each remote server 525 may include one or more VOD video servers, one or more muxs, and one or more transmitters similar to the arrangement shown in FIG. 4. The VOD control server 515 may process requests by clients for VOD programming, assign and allocate transport streams on RF channels and PIDs to clients on the fly, transmit media streams to the remote servers $525_1$-$525_C$, and control the remote servers $525_1$-$525_C$ over a control channel for transmitting VOD programming to subscribers. The VOD control server 515 may cause the remote servers $525_1$-$525_C$ to create dummy sessions or padding streams and spool out content to PIDs, without assigning clients to the PIDs. In another embodiment, each remote server 525 may separately and locally execute a process for creating dummy sessions and/or padding streams on the fly, according to the first embodiment. This frees up the VOD control server 515 to perform more system-wide tasks. Each remote server 525 may further include a random number generator device or process for filling null packets with a random or pseudo-random payload, according to the second embodiment.

The packet switched network 520 supports many different protocols such as TCP/IP for transmitting packets and asynchronous transfer mode (ATM) cells between the VOD control server 515 and remote servers $525_1$-$525_C$. In one embodiment, the packet-switched network 520 is the Internet and/or an Intranet.

The remote servers $525_1$-$525_C$ may be located at any physical point within the system. For example, the remote servers $525_1$-$525_C$ may be located at hubs, and each provides VOD programming to a multitude of clients at receivers $535_1$-$535_B$ over the HFC network 530. In another embodiment, the headend 510 may be substantially identical to the headend 410 to also spool out VOD programming to subscribing clients.

Embodiments of the present invention may be implemented as a method, apparatus, system, computer program product, signal, etc. When implemented in software, the elements of the present invention are essentially the code segments to perform the necessary tasks. The program or code segments can be stored in a processor readable medium or transmitted by a computer data signal embodied in a carrier wave over a transmission channel or medium. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A video-on-demand (VOD) system, comprising:
   a transmission channel;
   a plurality of receivers coupled to the transmission channel, a VOD client at each receiver capable of subscribing to one or more VOD sessions over a transport stream; and
   a headend coupled to the transmission channel, said headend including a video server that can transmit one or more VOD sessions to one or more receivers, and a control server coupled to the video server, the control server to dynamically allocate and terminate VOD sessions over the transport stream as VOD clients are added and terminated, and to cause the video server to transmit one or more dummy sessions over the transport stream to maintain the predetermined minimum bandwidth of content over the transport stream,
   wherein the control server is to prevent each receiver from decoding the dummy sessions.

2. A video-on-demand (VOD) system, comprising:
   a transmission channel;
   a plurality of receivers coupled to the transmission channel, a VOD client at each receiver capable of subscribing to one or more VOD sessions over a transport stream; and a headend coupled to the transmission channel, said headend including a video server that can transmit one or more VOD sessions to one or more receivers, and a control server coupled to the video server, the control server to dynamically allocate and terminate VOD sessions over the transport stream as VOD clients are added and terminated, and to cause the video server to transmit one or more dummy sessions over the transport stream to maintain the predetermined minimum bandwidth of content over the transport stream, wherein when the control server receives a request for a new VOD session from a VOD client, the control server terminates one or more of the one or more dummy sessions, and causes transmission of the new VOD session over the transport stream.

\* \* \* \* \*

UNITED STATES PATENT AND TRADEMARK OFFICE
CERTIFICATE OF CORRECTION

PATENT NO. : 7,657,913 B2  Page 1 of 1
APPLICATION NO. : 09/881609
DATED : February 2, 2010
INVENTOR(S) : Leo Mark Pedlow, Jr.

It is certified that error appears in the above-identified patent and that said Letters Patent is hereby corrected as shown below:

On the FACE PAGE:
  Column 2, ABSTRACT, line 5, delete "video-on demand" and insert --video-on-demand--.
In the SPECIFICATION:
  Column 1, line 5, delete "CROSS REFERENCES" and insert -- CROSS-REFERENCES--.

Signed and Sealed this

Twenty-fifth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,657,913 B2  
APPLICATION NO. : 09/881609  
DATED : February 2, 2010  
INVENTOR(S) : Leo Mark Pedlow, Jr.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2351 days.

Signed and Sealed this

Thirtieth Day of November, 2010

David J. Kappos
*Director of the United States Patent and Trademark Office*